(12) United States Patent
Silvestri et al.

(10) Patent No.: US 10,925,704 B2
(45) Date of Patent: Feb. 23, 2021

(54) INTERPROXIMAL ARTICULATION HOLDER

(71) Applicant: Microcopy Ltd., Afula (IL)

(72) Inventors: Anthony Silvestri, Plymouth, MA (US); Emily Brayman, Kennesaw, GA (US)

(73) Assignee: Microcopy, Ltd., Afula (IL)

( * ) Notice: Subject to any disclaimer, the term of this patent is extended or adjusted under 35 U.S.C. 154(b) by 109 days.

(21) Appl. No.: 15/420,866

(22) Filed: Jan. 31, 2017

(65) Prior Publication Data
US 2017/0216006 A1 Aug. 3, 2017

Related U.S. Application Data

(60) Provisional application No. 62/290,062, filed on Feb. 2, 2016.

(51) Int. Cl.
*A61C 19/05* (2006.01)

(52) U.S. Cl.
CPC ............ *A61C 19/052* (2013.01); *A61C 19/05* (2013.01)

(58) Field of Classification Search
CPC ......... A61C 19/052; A61C 19/05; A61C 9/00; A61C 19/04; A61C 11/005
USPC ....................................................... 433/70, 71
See application file for complete search history.

(56) References Cited

U.S. PATENT DOCUMENTS

| | | | |
|---|---|---|---|
| 2,633,637 A | 4/1953 | Lucia | |
| 3,126,631 A | 3/1964 | McCarthy et al. | |
| D220,433 S * | 4/1971 | McVey et al. | D24/152 |
| 4,183,139 A | 1/1980 | Tanaka | |
| 4,547,155 A | 10/1985 | Adler | |
| 4,734,034 A * | 3/1988 | Maness | A61C 19/05 338/99 |
| 4,856,993 A * | 8/1989 | Maness | A61C 19/05 433/68 |
| 5,181,849 A | 1/1993 | Callne | |

(Continued)

FOREIGN PATENT DOCUMENTS

| | | | |
|---|---|---|---|
| DE | 4436880 | 3/1996 | |
| DE | 4436880 C1 * | 3/1996 | A61C 11/00 |

(Continued)

OTHER PUBLICATIONS

European search report dated Jul. 4, 2017.

*Primary Examiner* — Cris L. Rodriguez
*Assistant Examiner* — Mirayda A Aponte
(74) *Attorney, Agent, or Firm* — Baker Donelson Bearman Caldwell & Berkowitz PC

(57) ABSTRACT

An interproximal articulation holder (10) has an arm (12) having a handle (11) at one end and an oppositely disposed holding head (16). The holding head is part of a marking portion (13) which also includes a piece of articulation film (18) having a generally rectangular shaped exposed area (18") extending beyond the holding head (16). The arm or holding head may include a score or score line (19) which enables the arm or head to be manually bent at an angle. This arm may also include forming notches (20) to aid in the bending process. The handle, arm and holding head may be formed of two or more outer layers of stock paper (21) laminated together with an inner layer of the wax coated articulation film positioned or sandwiched between the stock paper layers.

18 Claims, 2 Drawing Sheets

(56) References Cited

U.S. PATENT DOCUMENTS

| | | | |
|---|---|---|---|
| 5,326,261 A | 7/1994 | Rains | |
| 5,605,874 A | 2/1997 | Taylor et al. | |
| 5,851,114 A * | 12/1998 | Lee | A61C 3/00 |
| | | | 433/68 |
| 6,860,737 B2 | 3/2005 | Ulsoe | |
| 6,932,602 B2 | 8/2005 | Hamilton et al. | |
| 9,504,545 B2 | 11/2016 | McLeod | |
| 2009/0186316 A1 | 7/2009 | Hahn | |
| 2011/0151406 A1 * | 6/2011 | Solano | A61C 19/05 |
| | | | 433/162 |
| 2014/0099604 A1 * | 4/2014 | Kurpis | A61C 19/05 |
| | | | 433/223 |

FOREIGN PATENT DOCUMENTS

| | | | | |
|---|---|---|---|---|
| DE | 20015663 | | 12/2000 | |
| KR | 20130003890 U1 * | | 12/2011 | A61C 19/05 |
| KR | 2013/0003890 | | 7/2013 | |
| WO | WO-8605678 A1 * | | 10/1986 | A61C 19/05 |
| WO | WO-8902727 A1 * | | 4/1989 | A61C 19/05 |

* cited by examiner

INTERPROXIMAL ARTICULATION HOLDER

REFERENCE TO RELATED APPLICATION

Applicant claims the benefit of U.S. Provisional Patent Application Ser. No. 62/290,062 filed Feb. 2, 2016 and entitled Interproximal Articulation Holder.

TECHNICAL FIELD

This invention relates generally to a dental instrument, and more particularly to an interproximal articulation holder.

BACKGROUND OF INVENTION

Dental instruments have existed for decades. Today's dental instruments include devices designed to mark teeth so that a dentist may determine the proper spacing between adjacent teeth, or interproximally. Such spacing is important when sizing, shaping or fitting a cap, crown, veneer, onlays/inlays, bridges, partial, dental implant or the like, referred collectively herein as prosthesis.

Dentists often utilize specially designed metallic forceps to hold a small section of articulation film which mark the tooth upon contact. The articulation film is placed between adjacent teeth during the dental procedure to determine proper positioning or spacing. The problem with such forceps is that they are rather large, rigid, and cumbersome to manipulate within the confines of a person's mouth.

Another solution for marking teeth has been to apply a "paint-on contact" to the adjacent tooth or prosthesis prior to the positioning of the prosthesis. The contact of the prosthesis removes a portion of the paint-on contact, thereby indicating where contact is made between the adjacent tooth and prosthesis. This process however is messy and difficult to apply at times.

Yet another solution for marking teeth has been the use of an ink marker. Ink markers may come in the form of a short length of ink impregnated floss positioned within a disposable holder. The floss is forced between the adjacent tooth and prosthesis wherein the ink creates a smudge upon them. The ink smudge however may be difficult to discern or read.

Accordingly, it is seen that a need remains for dental marking holder, and specifically an interproximal articulation holder which is easy to manipulate and read. It is to the provision of such therefore that the present invention is primarily directed.

SUMMARY OF THE INVENTION

An interproximal articulation holder comprises an elongated handle having a gripping portion and a holding head oppositely disposed from the gripping portion, and a length of articulation film coupled to the holding head. The length of articulation film has an exposed portion with an exposed end edge located distally from the holding head and at least one exposed side edge extending between the holding head and the exposed end edge.

DETAILED DESCRIPTION

Figure 2:
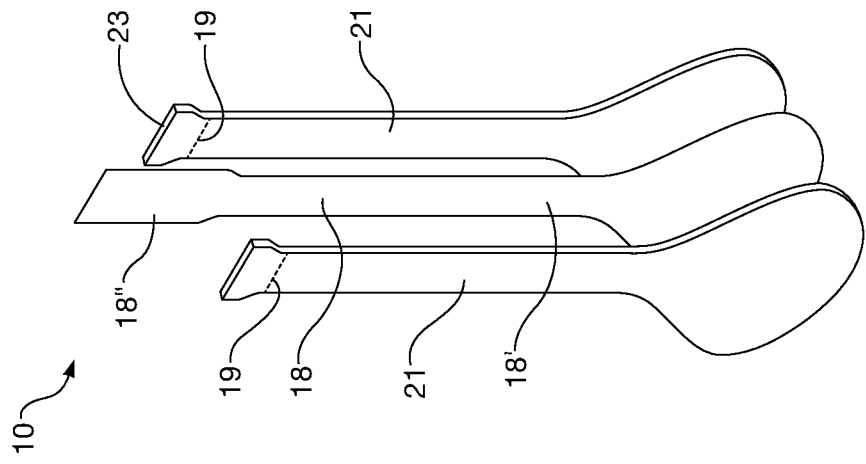
FIG. 2 is an exploded, perspective view of the interproximal articulation holder of FIG. 1.

With reference next to the drawings, there is shown a dental instrument designed to include and hold articulation paper or film according to a preferred form of the present invention. The dental instrument is designed to work best as an interproximal articulation holder 10, but is not limited to such.

The interproximal articulation holder 10 includes a stiff, yet flexible, enlarged handle, gripping portion, or handle portion 11 extending from one end of an elongated member or arm 12, and a marking portion 13 extending from an opposite end of the arm 12. The enlarged area of the handle 11 may be considered to be a gripping portion 14.

The marking portion 13 has a holding head 16 to which is mounted a piece of wax or ink coated articulation paper or film 18. The articulation film has an embedded portion 18' within the confines of the handle 11 and a generally rectangular shaped exposed area 18" extending outwardly beyond a terminal edge 23 of the holding head 16, although other shapes or rounded off corners on such may also be utilized without departure from the present invention. The articulation film 18 is oriented to extend generally co-longitudinally with or along the length of the arm 12. The exposed area 18" includes an exposed end edge 24 located distally from holding head 16 and two exposed side edges 25 extending between the end edge 24 and the holding head 16.

Figure 3:
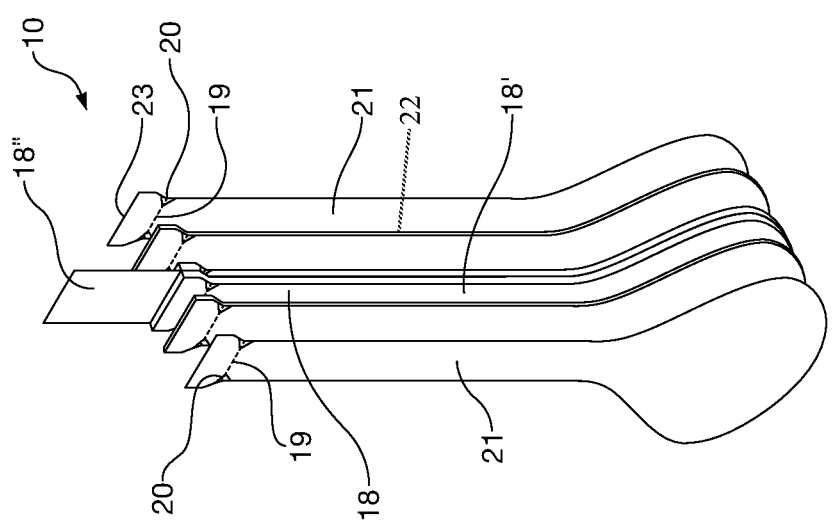
FIG. 3 is an exploded, perspective view of an interproximal articulation holder embodying principles of the invention in another preferred form.

The arm 12, holding head 16, or transitional area therebetween, may include a score or score line 19 which enables the arm holding head, or portion therebetween, to be manually creased or bent, thereby setting the holding head and the articulation film 18 at an angle with respect to at least a majority of the arm 12. The term score or score line used herein is intend to include any fold, embossing, punctures, crease, cut, or other preformed weakness or indentation, or the like. This bending may also be accomplished, alone or in combination with the score line 19, by forming notches 20 in the side edges of arm 12, holding head 16, or area therebetween, which decrease the width in this area, as shown in FIG. 3.

The handle 11, arm 12 and holding head 16 may be formed of two or more outer layers or sheets of plastic or stock paper 21 laminated together with an inner layer of the wax or ink coated articulation film 18 positioned or sandwiched between the plastic or stock paper layers 21. While the drawings show the articulation film 18 along the entire length of the handle, arm and holding head, it should be understood that alternatively it may be positioned within only a portion of such to secure the articulation film. The stock paper layers 21 may be a 8-18 tag stock. Alternatively, the handle, arm and head may be made of a plastic material or any other material which provides the structural stability while also enabling the retention memory of being bent.

The exposed area 18" of the articulation film 18 may have a preferred length extending beyond the holding head 16 of approximately 14 mm, a width of approximately 8 mm, and a thickness of approximately 19-20 microns. Alternatively, the articulation film 18 may be an impregnated ink type paper, however, as used herein the term articulation film is intended to include all types of such marking papers or films.

The layers of stock paper layers 21 and/or articulation film 18 may be laminated together, may be adhesively bonded together, or may be bonded in any other conventional manner.

In use, with the dental prosthesis removed from the patient's mouth, the holder 10 is partially inserted into the patient's mouth with the articulation film 18 positioned against the tooth adjacent the location of the prosthesis. The prosthesis is then placed into position within the patient's mouth where it comes into contact the articulation film, thereby creating a mark on the prosthesis and adjacent tooth. The dentist may then read or utilize the markings upon the prosthesis and tooth to determine if the prosthesis or tooth needs to be reshaped or adjusted to provide a proper or better fit.

The absence of structure on three sides of the exposed portion 18" of the articulation film 18 enables the holder 10 to be retracted easily while still being positioned between adjacent teeth and prosthesis. This also provides for a clear, unobstructed view of the exposed articulation film 18".

The desired positioning of the exposed portion 18" resulting from the angle or position of the mouth, teeth and prosthesis may necessitate that the holder 10 be angled to provide better ultimate location of the exposed portion 18". To accomplish this task, the user may fold, bend, or crease the holder 10 along the score line 19, or notch 20, or combination of the score line 19 and notch 20. The holder handle layers 21 hold the bend by providing a resistance to returning to the initial positioning of the handle.

It should be understood that the handle 11 may be formed, such as by pressing or embossing, to include a texture which increases the gripping ability of the handle 11. Alternatively, the handle 11 may be provided with one or more holes or peripheral notches which enhance the gripping capabilities.

Figure 1:
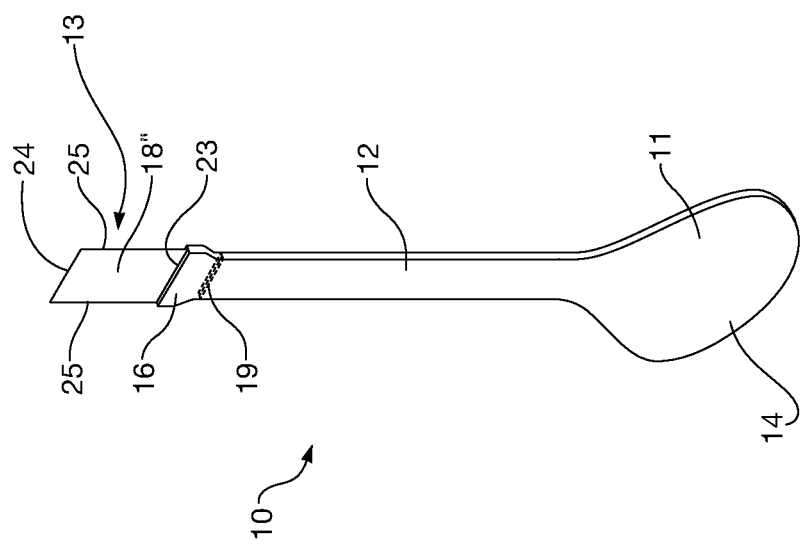
FIG. 1 is a perspective front view of an interproximal articulation holder embodying principles of the invention in a preferred form.

With reference next to FIG. 3, there is shown a holder which is very similar to the holder described in reference to FIGS. 1-2. Here, the holder includes one or more metallic foil layers 22, or the like, to provide a greater memory attribute so that if the arm 12 or holding head 19 is bent at an angle, the holder will resist returning to its initial, unbent configuration, i.e., the bend will remain in place.

Figure 4:
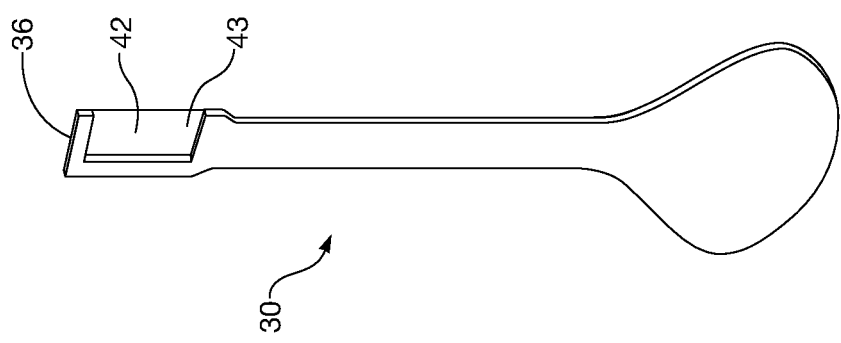
FIG. 4 is a perspective view of an interproximal articulation holder embodying principles of the invention in yet another preferred form.

With reference next to FIG. 4, there is shown a holder 30 in another preferred form of the invention. Here, the holding head 36 wraps about one side edge and top edge of the exposed portion of the articulation film 42. While this embodiment is included as an alternative design, it is not preferred as the additional structure of the head about the exposed portion of the articulation film 42 may impede removal or obscure the view of the dentist. Here, the exposed area of the articulation film 42 includes an exposed side edge 43 extending from the holding head 36.

Figure 5:
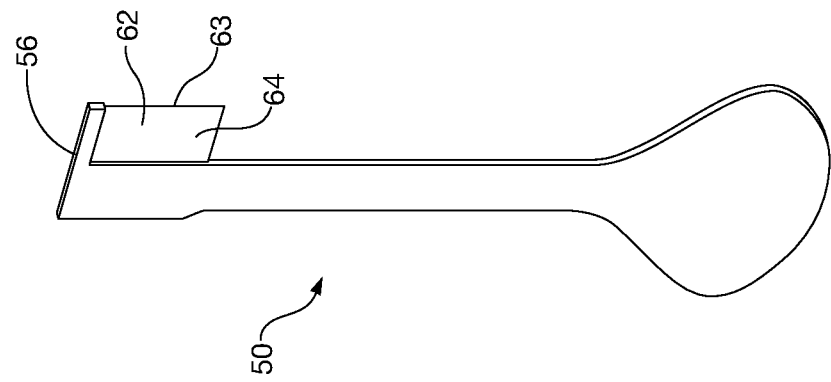
FIG. 5 is a perspective view of an interproximal articulation holder embodying principles of the invention in yet another preferred form.

With reference next to FIG. 5, there is shown a holder 50 in another preferred form of the invention. Here, the holding head 56 wraps about one side edge and top edge of the exposed portion of the articulation film 62. Again, this embodiment, while included as an alternative embodiment, is not preferred as the additional structure of the holding head about the articulation film 62 may impede removal or obscure the view of the dentist. Here, the exposed area of the articulation film 62 includes an exposed side edge 63 extending from the holding head 56 and an end edge 64 located distally from holding head 56.

It should be understood that the arm 12 has a width, the lateral distance across the arm 12 shown in FIG. 1, which is less than the width of the gripping portion 11. The arm may also be tapered to a reduced width from the gripping end to the holding head. This configuration allows the holder to be better placed into the mouth while still providing adequate gripping of the holder.

It should be understood that the term stiff, as used herein in reference to the handle, is intend to mean that the handle will not fold or bend substantially under its own weight or its own weight in combination with the articulation film.

It thus is seen that a dental tool is now provided which overcomes problems associated with the prior art. While this invention has been described in detail with particular references to the preferred embodiments thereof, it should be understood that many modifications, additions and deletions, in addition to those expressly recited, may be made thereto without departure from the spirit and scope of the invention.

The invention claimed is:

1. An interproximal articulation holder comprising:
   an elongated handle having a gripping portion and a holding head oppositely disposed from said gripping portion,
   a length of ink marking articulation film fixedly coupled to said holding head, said length of ink marking articulation film being an articulation film impregnated with an ink marker for marking the tooth or prosthesis at the place of contact, said length of ink marking articulation film having an exposed portion with an exposed end edge located distally from said holding head and extending perpendicularly to the longitudinal length of said elongated handle and at least one exposed side edge extending between said holding head and said exposed end edge with said side edge extending parallel to the longitudinal length of said elongated handle, and
   wherein said elongated handle gripping portion and said elongated handle holding head each include two sheets of flexible material, wherein each said sheet of said two sheets of flexible material is positioned upon one side of said length of ink marking articulation film, and wherein said elongated handle gripping portion and said elongated handle holding head each include a metallic layer of material positioned between said two sheets of flexible material.

2. The interproximal articulation holder of claim 1 wherein said length of ink marking articulation film includes two, oppositely disposed side edges.

3. The interproximal articulation holder of claim 1 wherein said handle includes a score line oriented transversely to the longitudinal length of said elongated handle, whereby the score line enables the handle to be bent along the score line.

4. The interproximal articulation holder of claim 3 wherein said handle includes at least one notch aligned with said score line.

5. The interproximal articulation holder of claim 1 wherein said handle includes a notch,
   whereby the notch enables the handle to be bent in alignment with the notch.

6. The interproximal articulation holder of claim 1 wherein said gripping portion and said holding head are spanned by an arm portion having a width smaller than the width of the gripping portion.

7. An interproximal articulation holder comprising:
   an elongated handle having at least two handle layers of flexible material, and a length of ink marking articulation film fixedly mounted to said elongated handle and having an embedded portion positioned between at least a portion of said at least two handle layers of flexible material, said length of ink marking articulation film being an articulation film impregnated with an ink marker for marking the tooth or prosthesis at the place of contact, said length of ink marking articulation film also having an exposed portion extending outwardly from said handle along a longitudinal direction aligned along the longitudinal direction of said elongated handle, wherein said elongated handle has a score line positioned closely adjacent said exposed portion of said length of ink marking articulation film, said score line extending perpendicularly to the longitudinal length of said elongated handle.

8. The interproximal articulation holder of claim 7 wherein said exposed portion of said length of ink marking articulation film includes an exposed end edge located distally from said handle.

9. The interproximal articulation holder of claim 8 wherein said length of ink marking articulation film includes two, oppositely disposed side edges, each side edge extending between said handle and said exposed end.

10. The interproximal articulation holder of claim 7 wherein said at least two handle layers are flexible layers having said score line.

11. The interproximal articulation holder of claim 7 wherein said elongated handle includes at least one notch aligned with said score line and extending into said elongated handle in a direction perpendicular to the longitudinal length of the elongated handle.

12. The interproximal articulation holder of claim 7 wherein said elongated handle includes a notch closely adjacent said exposed portion of said length of ink marking articulation film, whereby the notch enables the handle to be bent in alignment with the notch.

13. An interproximal articulation holder comprising an elongated handle having at least two handle layers and a metallic layer of material positioned between said two handle layers, the handle having a holding head and a gripping portion, and a length of ink marking articulation film impregnated with an ink marker for marking the tooth or prosthesis at the place of contact, the length of ink marking articulation film having an embedded portion positioned between at least a portion of said at least two handle layers and an exposed portion extending outwardly from said handle, and wherein said length of ink marking articulation film exposed portion extends between said holding head and said gripping portion.

14. An interproximal articulation holder comprising:
an elongated handle having a gripping portion and an elongated handle terminal edge located distally said gripping portion and extending perpendicularly to the longitudinal length of said elongated handle, and a score line extending perpendicularly to the longitudinal length of said elongated handle, and a length of ink marking articulation film fixedly coupled to said elongated handle at said terminating edge, said length of ink marking articulation film being an articulation film impregnated with an ink marker for marking the tooth or prosthesis at the place of contact, said length of ink marking articulation film having an exposed end edge oppositely disposed from said terminating edge of said elongated handle and extending parallel to the terminating edge of said elongated handle and two oppositely disposed, exposed side edges extending between said terminating edge of said elongated handle and said exposed end edge of said ink marking articulation film.

15. The interproximal articulation holder of claim 14 wherein said elongated handle includes two sheets of flexible material wherein each said sheet of flexible material is positioned upon one side of said length of ink marking articulation film.

16. The interproximal articulation holder of claim 14 wherein said handle includes at least one notch aligned with said score line and extending into said elongated handle in a direction perpendicular to the longitudinal length of the elongated handle.

17. An interproximal articulation holder comprising:
an elongated handle having a gripping portion and a terminating edge located distally said gripping portion and extending perpendicularly to the longitudinal length of said elongated handle, said handle includes a notch which extends into said elongated handle in a direction perpendicular to the longitudinal length of the elongated handle, and a length of ink marking articulation film fixedly coupled to said elongated handle at said terminating edge, said ink marking articulation film being an articulation film impregnated with an ink marker for marking the tooth or prosthesis at the place of contact, said length of ink marking articulation film having an exposed end edge oppositely disposed from said terminating edge of said elongated handle and extending parallel to the terminating edge of said elongated handle and two oppositely disposed, exposed side edges extending between said terminating edge of said elongated handle and said exposed end edge of said ink marking articulation film, whereby the notch enables the handle to be bent in alignment with the notch.

18. An interproximal articulation holder comprising:
an elongated handle having a gripping portion and a terminating edge located distally said gripping portion, and said terminal edge extending generally perpendicularly to the longitudinal length of said elongated handle, a length of ink marking articulation film fixedly coupled to said elongated handle at said terminating edge, said ink marking articulation film being an articulation film impregnated with an ink marker for marking the tooth or prosthesis at the place of contact, said length of ink marking articulation film having an exposed end edge oppositely disposed from said terminating edge of said elongated handle and extending generally parallel to the terminating edge of said elongated handle and two oppositely disposed, exposed side edges extending between said terminating edge of said elongated handle and said exposed end edge of said length of ink marking articulation film, said elongated handle including two sheets of flexible material wherein each said sheet of the two sheets of flexible material is positioned upon one side of said length of ink marking articulation film and at least one metallic layer of material positioned between said two sheets of flexible material.

* * * * *